United States Patent [19]
Kim

[11] Patent Number: 5,864,627
[45] Date of Patent: Jan. 26, 1999

[54] PORTABLE SOUND SYSTEM

[76] Inventor: Youngkook Kim, 2625 Samnewell Rd., Matthews, N.C. 28105

[21] Appl. No.: 799,382

[22] Filed: Feb. 14, 1997

[51] Int. Cl.$^6$ .................................................... H04B 1/00
[52] U.S. Cl. .............................. 381/86; 455/346; 455/348
[58] Field of Search .................................. 455/346, 347, 455/348, 349; 381/86

[56] References Cited

U.S. PATENT DOCUMENTS 2,662,975  12/1953  Schwarz.
2,866,891  12/1958  Princ.
3,405,944  10/1968  Krechman.
4,807,292  2/1989  Sorscher.

*Primary Examiner*—Forester W. Isen

[57] ABSTRACT

A new Portable Sound System for providing a sound system which is operable while mounted in a vehicle and also operable independent of any such mounting The inventive device includes a housing, a sound signal generating unit located in the housing a housing speaker mounted in the housing and electrically connected to the sound signal generating unit and a mounting frame permanently mountable in a vehicle wherein the housing is removably mountable in the mounting frame and wherein the housing and the mounting frame include mating connectors for connecting the sound signal (generating unit to the electrical power system of the vehicle and the vehicle speakers when the housing is mounted in the mounting frame. A power supply is provided in the housing for powering the sound signal generating unit when the housing is removed from the mounting frame. The power supply may be a rechargeable battery that can be recharged by the electrical power system of the vehicle when the housing is inserted in the mounting frame.

1 Claim, 4 Drawing Sheets

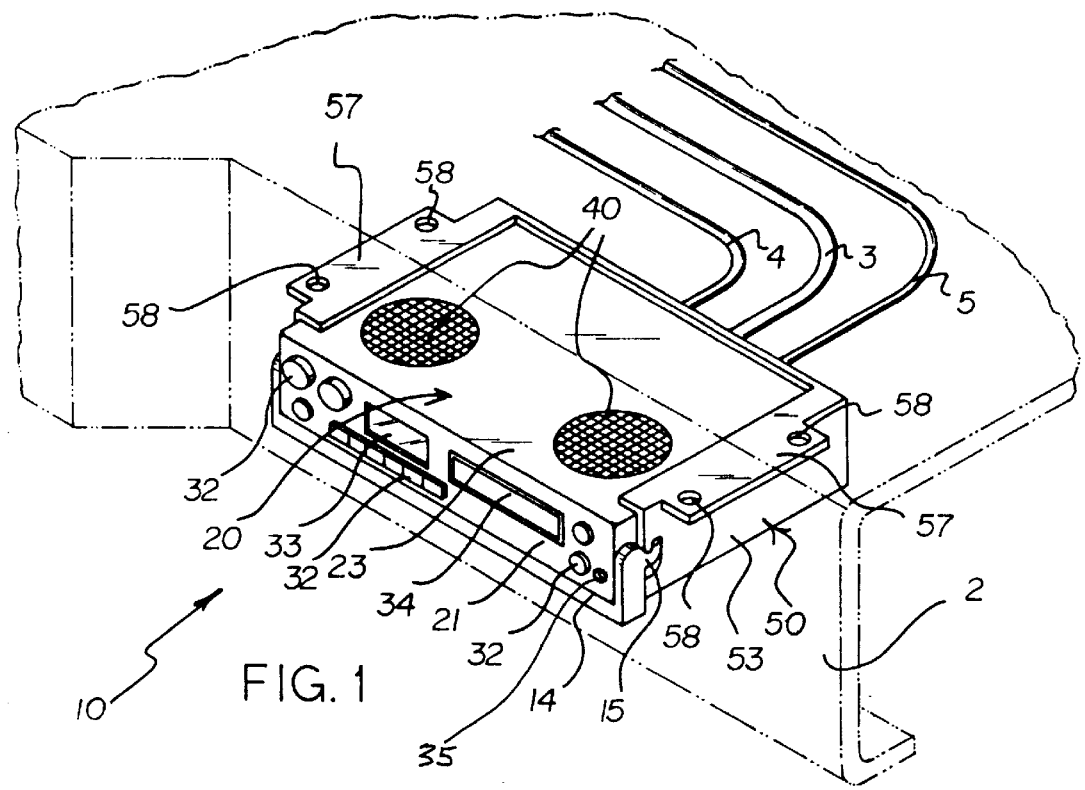
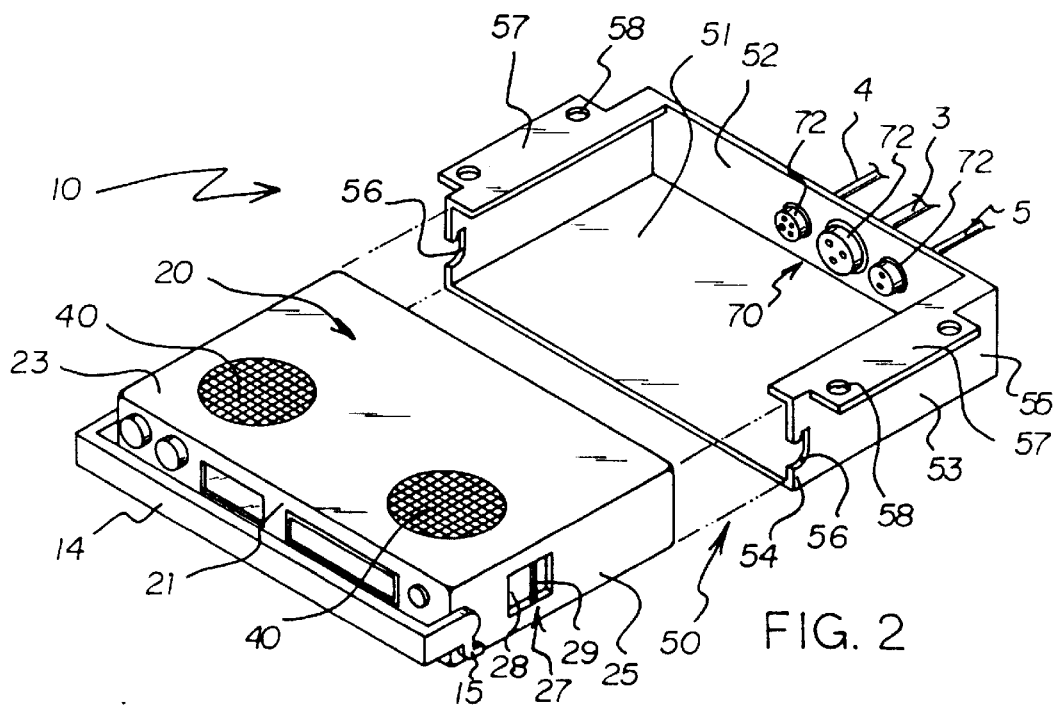

PORTABLE SOUND SYSTEM

BACKGROUND OF THE INVENTION

1. Field of the Invention

The present invention relates to sound systems and more particularly pertains to a new Portable Sound System for providing a sound system which is operable while mounted in a vehicle and also operable independent of any such mounting.

2. Description of the Prior Art

The use of sound systems is known in the prior art. More specifically, sound systems heretofore devised and utilized are known to consist basically of familiar., expected and obvious structural configurations, notwithstanding the myriad of designs encompassed by the crowded prior art which have been developed for the fulfillment of countless objectives and requirements.

Known prior art sound systems include U.S. Pat. No. 4,784,361; U.S. Pat. No. 5,441,421; U.S. Pat. No. 5,381,684; U.S. Pat. No. D317,607; U.S. Pat. No. 4,450,495 and U.S. Pat. No. 5,341,434.

While these devices fulfill their respective, particular objectives and requirements, the aforementioned patents do not disclose a new Portable Sound System. The inventive device includes a housing, a sound signal generating unit located in the housing, a housing speaker mounted in the housing and electrically connected to the sound signal generating unit, and a mounting frame permanently mountable in a vehicle, wherein the housing is removably mountable in the mounting frame and wherein the housing and the mounting frame include mating connectors for connecting the sound signal generating unit to the electrical power system of the vehicle and the vehicle speakers when the housing is mounted in the mounting frame.

In these respects, the Portable Sound System according to the present invention substantially departs from the conventional concepts and designs of the prior art, and in so doing provides an apparatus primarily developed for the purpose of providing a sound system which is operable while mounted in a vehicle and also operable independent of any such mounting.

SUMMARY OF THE INVENTION

In view of the foregoing disadvantages inherent in the known types of sound systems now present in the prior art, the present invention provides a new Portable Sound System construction wherein the same can be utilized for providing a sound system which is operable while mounted in a vehicle and also operable independent of any such mounting.

The general purpose of the present invention, which will be described subsequently in greater detail is to provide a new Portable Sound System apparatus and method which has many of the advantages of the sound systems mentioned heretofore and many novel features that result in a new Portable Sound System which is not anticipated, rendered obvious, suggested, or even implied by any of the prior art sound systems, either alone or in any combination thereof.

To attain this, the present invention generally comprises a housing, a sound signal generating unit located in the housing, a housing speaker mounted in the housing and electrically connected to the sound signal generating unit, and a mounting frame permanently mountable in a vehicles wherein the housing is removably mountable in the mounting frame and wherein the housing and the mounting frame include mating connectors for connecting the sound signal generating unit to the electrical power system of the vehicle and the vehicle speakers when the housing is mounted in the mounting frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Portable Sound System apparatus and method which has many of the advantages of the sound systems mentioned heretofore and many novel features that result in a new Portable Sound System which is not anticipated, rendered obvious suggested, or even implied by any of the prior art sound systems, either alone or in any combination thereof.

It is another object of the present invention to provide a new Portable Sound System which may be easily and efficiently manufactured and marketed.

It is a further object of the present invention to provide a new Portable Sound System which is of a durable and reliable construction.

An even further object of the present invention is to provide a new Portable Sound System which is susceptible of a low cost of manufacture with regard to both materials and labor, and which accordingly is then susceptible of low prices of sale to the consuming public thereby making such Portable Sound System economically available to the buying public.

Still yet another object of the present invention is to provide a new Portable Sound System which provides in the apparatuses and methods of the prior art some of the advantages thereof, while simultaneously overcoming some of the disadvantages normally associated therewith.

Still another object of the present invention is to provide a new Portable Sound System for providing a sound system which is operable while mounted in a vehicle and also operable independent of any such mounting.

Yet another object of the present invention is to provide a new Portable Sound System which includes a housing a sound signal generating unit located in the housing, a housing speaker mounted in the housing and electrically connected to the sound signal generating unit, and a mounting frame permanently mountable in a vehicle, wherein the housing is removably mountable in the mounting frame and wherein the housing and the mounting frame include mating connectors for connecting the sound signal generating unit to the electrical power system of the vehicle and the vehicle speakers when the housing is mounted in the mounting frame.

Still yet another object of the present invention is to provide a new Portable Sound System that expands the use of a sound system by offering a single sound system that can be used in multiple environments.

Even still another object of the present invention is to provide a new Portable Sound System that eliminates the need for purchasing a separate sound system for use in a vehicle, use at home use at work, use at the park or beach, etc.

Even still another object of the present invention is to provide a new Portable Sound System that is removable from a vehicle to prevent theft of the system in the owner's absence.

These together with other objects of the invention, along with tile various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an illustration of a new Portable Sound System installed in a vehicle according to the present invention.

FIG. 2 is an illustration of the mounting frame for use in mounting the present invention in a vehicle.

DESCRIPTION OF THE PREFERRED EMBODIMENT

Figure 3:
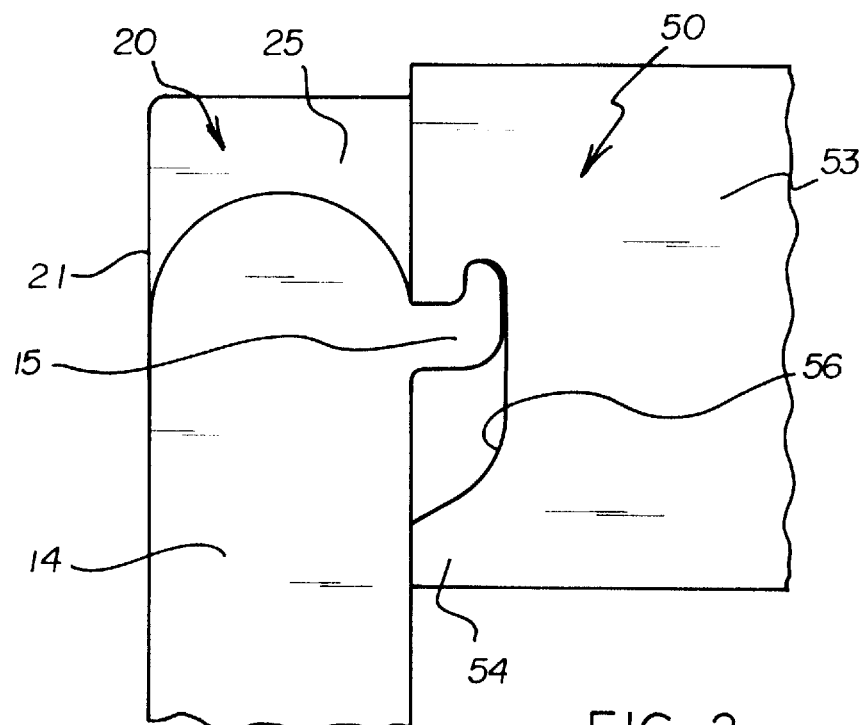
FIG. 3 is a detailed illustration of the handle locking mechanism of the present invention.

With reference now to the drawings, and in particular to FIGS. 1 through 7 thereof a new Portable Sound System embodying the principles and concepts of the present invention and generally designated by the reference numeral 10 will be described.

More specifically, it will be noted that the Portable Sound System 10 comprises a housing 20 a sound signal generating unit 30 located in the housing 20, a housing speaker 40 mounted in the housing 20 and electrically connected to the sound signal generating unit 30, and a mounting frame 50 permanently mountable in a vehicle 2, wherein the housing 20 is removably mountable in the mounting frame 50 and wherein the housing 20 and the mounting frame 50 include mating connectors 70 for connecting the sound signal generating unit 30 to the electrical power system 3 of the vehicle 2 and the vehicle speakers 4 when the housing 20 is mounted in the mounting frame 50.

As best illustrated in FIGS. 1, 2, 5 and 6, it can be shown that the housing 20 has a front surface 21, a rear surface 22, a top surface 23, a bottom surface 24, and a pair of side surfaces 25. A carrying strap 19 is provided for carrying the housing 20 when the housing 20 is removed from the mounting frame 50. The housing 20 includes a carrying strap connection means 27 for permitting the carrying strap 19 to be removably connected to the housing 20. The carrying strap connection means 27 comprises a connection strap cavity 28 provided in each of the pair of side surfaces 25 and a connection strap bar 29 provided in the opening of the connection strap cavity 28, whereby the carrying strap 19 is removably connected to the connection strap bar 29.

The sound signal generating unit 30 generates sound signals and includes an AM/FM radio receiver, a cassette player, or a compact disc player. As best illustrated in FIG. 1, it can be shown that operating knobs and buttons 32 for operating the sound signal generating unit 30. a display area 33, and an opening 34 for a cassette or a compact disc are provided on the front surface 21 of the housing 20. The operating knobs and buttons 32 include a power knob, a volume control knob, a tone knob, radio preset knobs, etc. A headphone jack 35 is provided on the front surface 21 of the housing 20 for accommodating a headphone plug (not shown) of a pair of headphones (not shown).

The housing speaker 40 is mounted in the housing 20 and electrically connected to the sound signal generating unit 30 for converting the sound signals of the sound signal generating unit 30 into sound. As best illustrated in FIGS. 1 and 2, it can be shown that the housing speaker 40 is mounted flush with the top surface 23 of the housing 20 so as not to interfere with the mounting frame 50 when tile housing 20 is inserted in and removed from the mounting frame 50.

Figure 7:
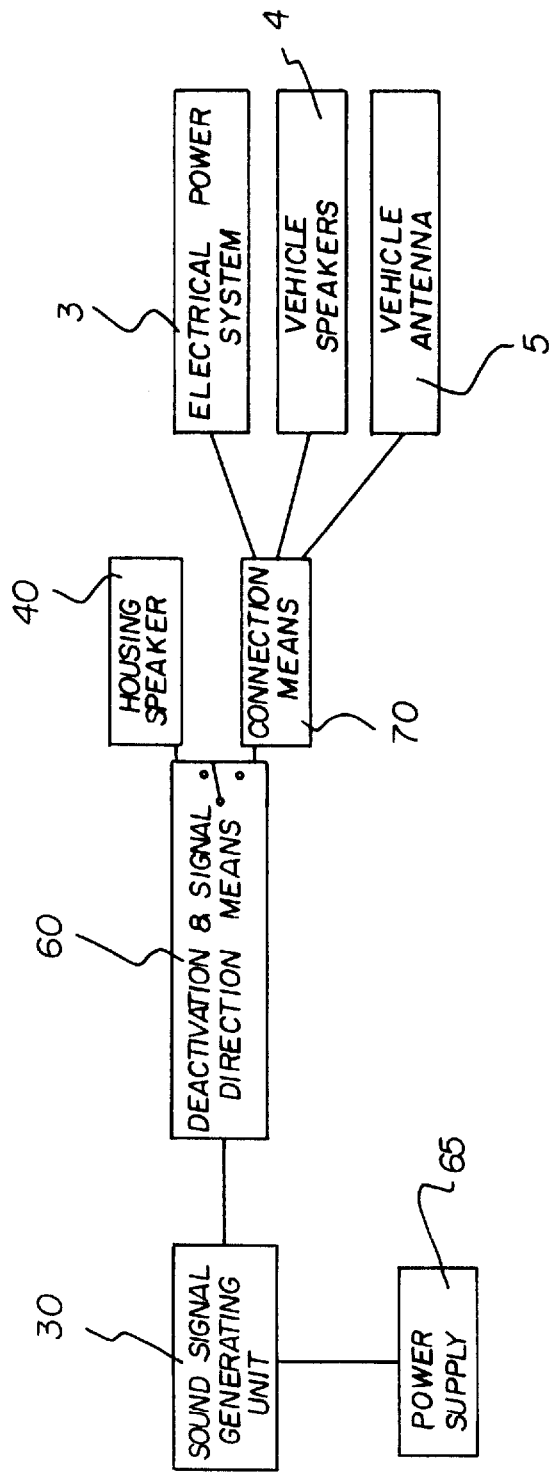
FIG. 7 is a schematic illustration of the present invention.

As best illustrated in FIG. 7 it can be shown that a deactivation and signal direction means 60 is provided in the housing 20 for deactivating operation of the housing speaker 40 when the housing 20 is inserted in the mounting frame 50 and for directing the sound signals generated by the sound signal generating unit 30 to the vehicle speakers 4 provided in the vehicle 2 when the housing 20 is inserted in the mounting frame 50.

A power supply 65 is provided in the housing 20 for powering the sound signal generating unit 30 when the housing 20 is removed from the mounting frame 50. The power supply 65 may be a rechargeable battery that can be recharged by the electrical power system 3 of the vehicle 2 when the housing 20 is inserted in the mounting frame 50. The sound signal generating unit 30 may also be powered by 120 volts AC when the housing 20 is removed from the mounting frame 50. A power supply access panel 66 is provided in the bottom surface 24 of the housing 20 to allow access to the rechargeable battery.

As best illustrated in FIG. 2, it can be shown that the mounting frame 50 has an interior cavity 51 therein for removably receiving the housing 20 such that the housing 20 is removably supported in the vehicle 2. The mounting frame 50 has a rear wall 52 and a pair of side walls 53. Each of the pair of side walls has a front end 54 and a rear end 55. A slot 56 is provided in the front end 54 of each of the pair of side walls 53. The mounting frame 50 includes a pair of mounting ears 57 extending from the pair of side walls 53 for securing the mounting frame 50 in the vehicle 2. Each of the pair of mounting ears 57 has a fastener receiving hole 58 therein.

Figure 5:
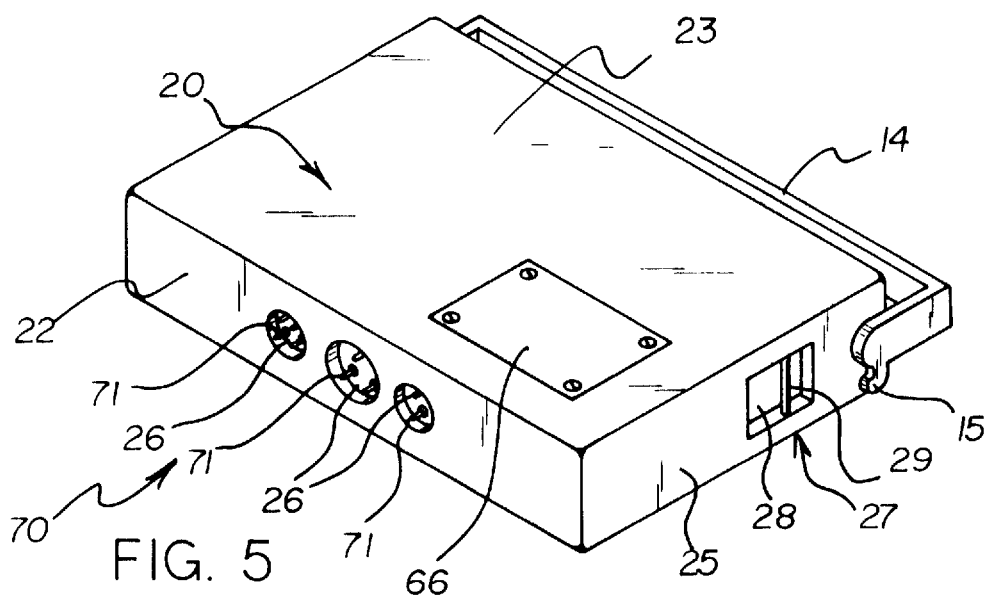
FIG. 5 is an illustration of the bottom surface of the housing of the present invention.
Figure 6:
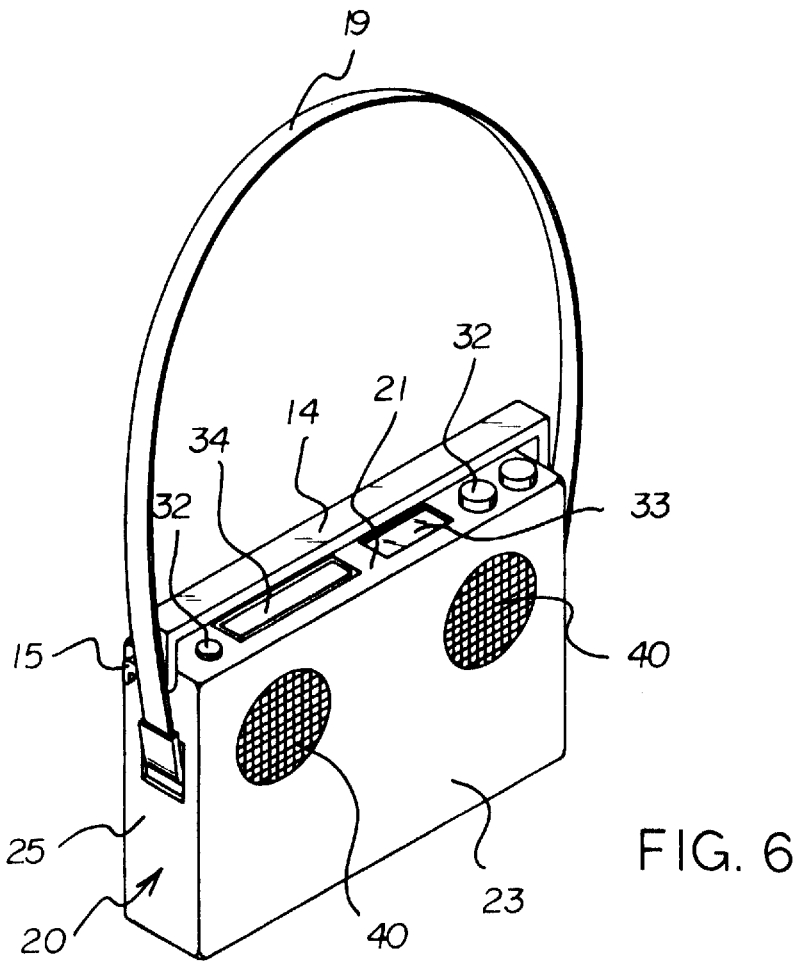
FIG. 6 is an illustration of the present invention for use outside a vehicle.

As best illustrated in FIGS. 2 and 5, it can be shown that a connection means 70 is provided for connecting the power supply 65 and the sound signal generating unit 30 to the electrical power system 3 of the vehicle 2, the vehicle speakers 4, and the vehicle antenna 5 when the housing 20 is inserted in the mounting frame 50. The connection means 70 comprises a first terminal 71 connected to the power supply 65 and the sound signal generating unit 66 and a second terminal 72 connected to the electrical power system 3 of the vehicle 2. The vehicle speakers 4, and the vehicle antenna 5. The first terminal 71 is provided in the rear surface 22 of the housing 20 and the second terminal 72 is provided in the rear wall 52 of the mounting frame 50, wherein the first terminal 71 and the second terminal 72 are joined together in mating engagement to provide electrical connections therebetween when the housing 20 is inserted in the mounting frame 50. A recessed cavity 26 is provided in the rear surface 22 of the housing 20 and the first terminal 71 is positioned within the recessed cavity 26 so as to protect the first terminal 71 against damage when the housing 20 is removed from the mounting frame 50.

Figure 4:
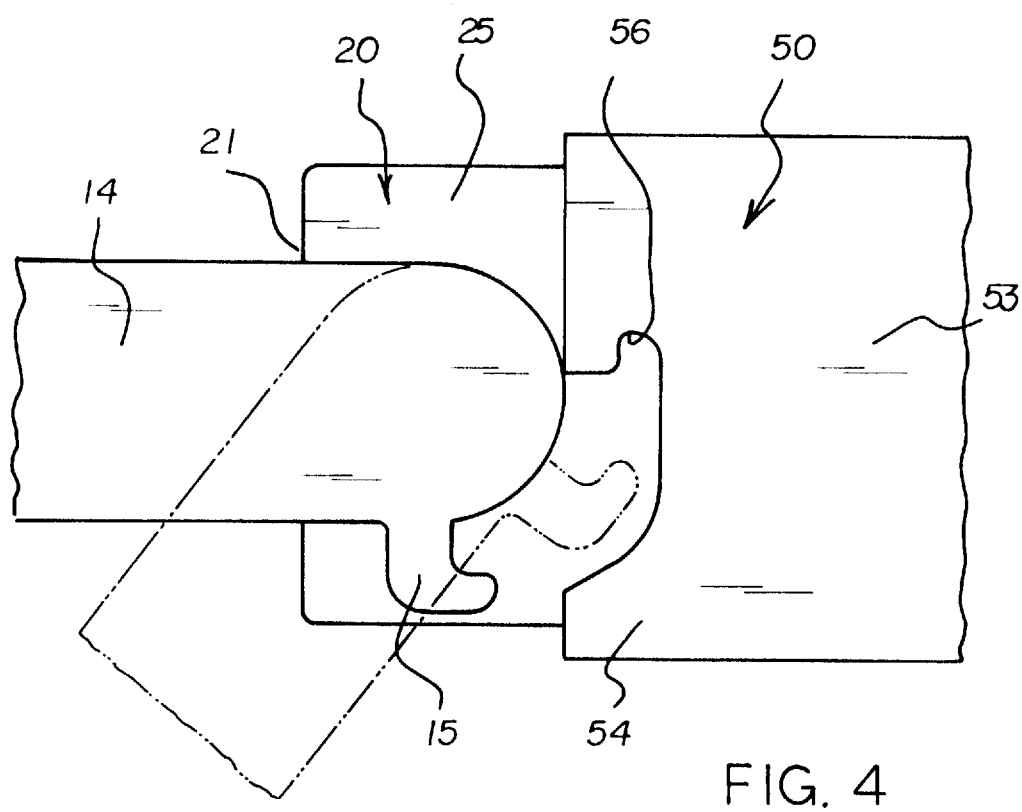
FIG. 4 is a detailed illustration of the handle locking mechanism of the present invention.

As best illustrated in FIGS. 2 through 4, it can be shown that a handle 14 is pivotally mounted to the pair of side surfaces 25 of the housing 20 adjacent the front Surface 21. The handle 14 includes a pair of arms 15 which extend from opposites ends of the handle 14 whereby when the handle 14 is lowered each of the pair of arms 15 engages the slot 56 provided in the front end 54 of each of the pair of side walls 53 of the mounting frame 50 and the housing 20 is securely mounted in the mounting frame 50. When the handle 14 is raised, each of the pair of arms 15 disengages the slot 56 and the housing 20 can be removed from the mounting frame 50.

In use, the housing 20 is inserted in the interior cavity 51 of the mounting frame 50 wherein the first terminal 71 and the second terminal 72 are joined together in mating engagement to provide electrical connections therebetween thereby connecting the power supply 65 and the sound signal generating unit 30 to the electrical power system 3 of the vehicle 2, the vehicle speakers 4, and the vehicle antenna 5. The handle 14 is lowered and each of the pair of arms 15 engages the slot 56 provided in the front end 54 of each of the pair of side walls 53 of the mounting frame 50 whereby the housing 20 is securely mounted in the mounting frame 50. The deactivation and signal direction means 60 provided in the housing 20 deactivates operation of the housing speaker 40 and directs the sound signals generated by the sound signal generating unit 30 to the vehicle speakers 4 provided in the vehicle 2. The sound signal generating unit 30 is operated by the operating knobs and buttons 32 and the generated sound signals are converted into sound by the vehicle speakers 4 while the rechargeable battery is recharged by the electrical power system 3 of the vehicle 2.

For operation away from the vehicle 2, the handle 14 is raised and the pair of arms 15 disengage the slots 56 provided in the front end 54 of each of the pair of side walls 53 of the mounting frame 50. The housing 20 is then removed from the mounting frame 50. The carrying strap 19 is removably connected to the connection strap bar 29 of the housing 20 whereby the housing 20 can be easily carried. The sound signal generating unit 30 is operated and the sound signals generated are converted into sound by the housing speaker 40 mounted in the housing 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are described readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents nay be resorted to, falling within the scope of the invention.

What is claimed as being new and desired to be protected by Letters Patent of the United States is as follows:

1. A portable sound system for operating while mounted in a vehicle including an electrical power system, a vehicle speaker, and a vehicle antenna and for operating independent of any such mounting in said vehicle, said portable sound system comprising:

a housing, said housing having a front surface and a rear surface;

a sound signal generating unit, said sound signal generating unit being provided in said housing, said sound signal generating unit being for generating sound signals;

a housing speaker mounted in said housing and electrically connected to said sound signal generating unit, said housing speaker being for converting said sound signals of said sound signal generating unit into sound;

a mounting frame for permanently mounting in said vehicle, said mounting frame having an interior cavity, said cavity being for removably receiving said housing such that said housing is removably supported in said vehicle;

a connection means for connecting said sound signal generating unit to said electrical power system of said vehicle, said vehicle speaker, and said vehicle antenna when said housing is inserted in said interior cavity of said mounting frame;

a deactivation means provided in said housing for deactivating operation of said housing speaker when said housing is inserted in said mounting frame, and a signal direction means for directing said sound signals generated by said sound signal generating unit to said vehicle speaker when said housing is inserted in said mounting frame; and a power source provided in said housing for powering said sound signal generating unit when said housing is removed from said mounting frame and disconnected from said electrical power system of said vehicle;

wherein said connection means includes a means for connecting said power source to said electrical power system of said vehicle;

wherein said power source is a rechargeable battery that is adapted to be recharged by said electrical power system of said vehicle when said housing is inserted in said mounting frame, wherein said mounting frame has a rear wall;

wherein said connection means comprises:
- a first terminal connected to said power source and said sound signal generating unit, said first terminal provided in said rear surface of said housing, and
- a second terminal connected to said electrical power system of said vehicle, said vehicle speaker, and said vehicle antenna, said second terminal provided in said rear wall of said mounting frame,
- said first terminal and said second terminal being joined together in mating engagement to provide electrical connections therebetween when said housing is inserted in said mounting frame;

wherein said rear surface of said housing has a recessed cavity therein;

wherein said first terminal is positioned within said recessed cavity;

wherein said mounting frame includes a pair of mounting ears for securing said mounting frame in said vehicle, each of said pair of mounting ears having a fastener receiving hole therein;

a handle pivotally mounted to said housing for inserting said housing in and removing said housing from said mounting frame, said handle including a pair of arms which extend from opposite ends of the handle, wherein upon the handle being lowered, the pair of arms engages slots formed in a front end of side walls of the mounting frame to secure the housing in the mounting frame, wherein upon the handle being raised, the pair of arms disengages the slots of the mounting frame to allow the release of the housing from the mounting frame;

a carrying strap removably connected to recessed connectors situated on side faces the housing for carrying said housing when said housing is removed from said mounting frame;

wherein said housing includes a carrying strap connection means for permitting said carrying strap to be removably connected to said housing;

wherein said sound signal generating unit is at least one of an AM/FM radio receiver, a cassette player, and a compact disc player;

operating knobs and buttons provided on said front surface of said housing for operating said sound signal generating unit;

a headphone jack provided on said front surface of said housing for accommodating a headphone plug of a pair of headphones, wherein said housing has a top surface, and wherein said housing speaker is mounted flush with said top surface of said housing.

* * * * *